W. K. FREEMAN.
APPARATUS FOR HARVESTING THE CONSTITUENTS OF WOOD AND VEGETABLE SUBSTANCES, DISTILLING AND PURIFYING THEM.
APPLICATION FILED AUG. 14, 1913.
1,231,247.
Patented June 26, 1917.
4 SHEETS—SHEET 1.
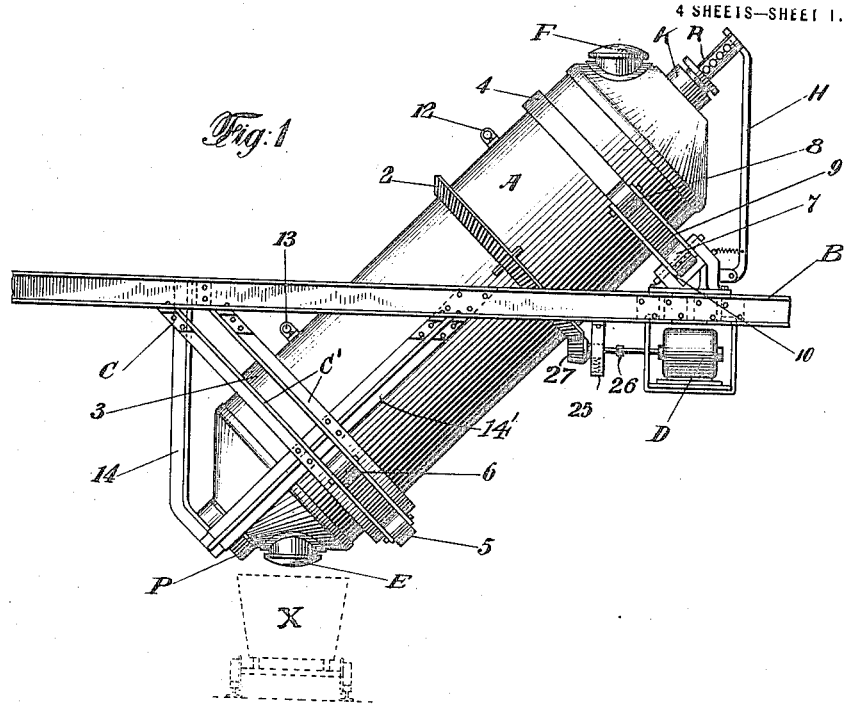
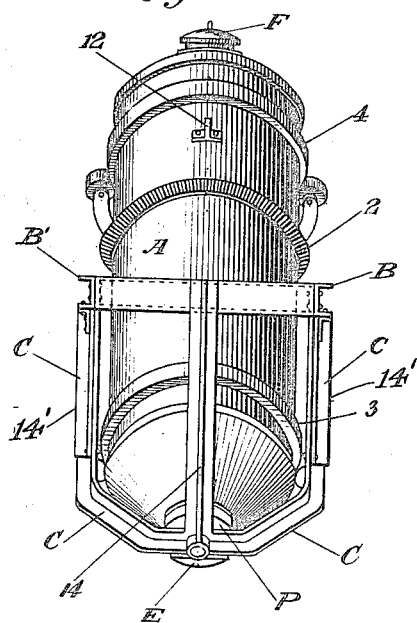 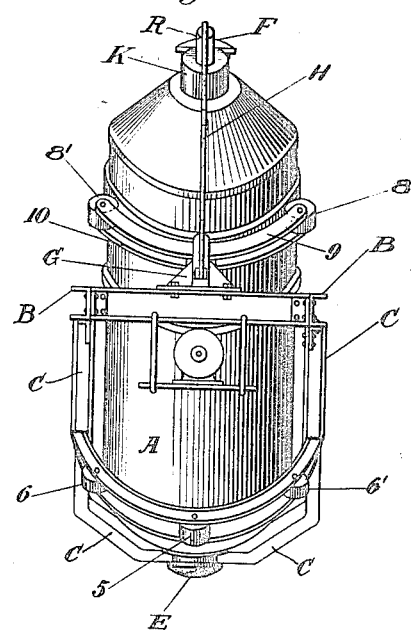

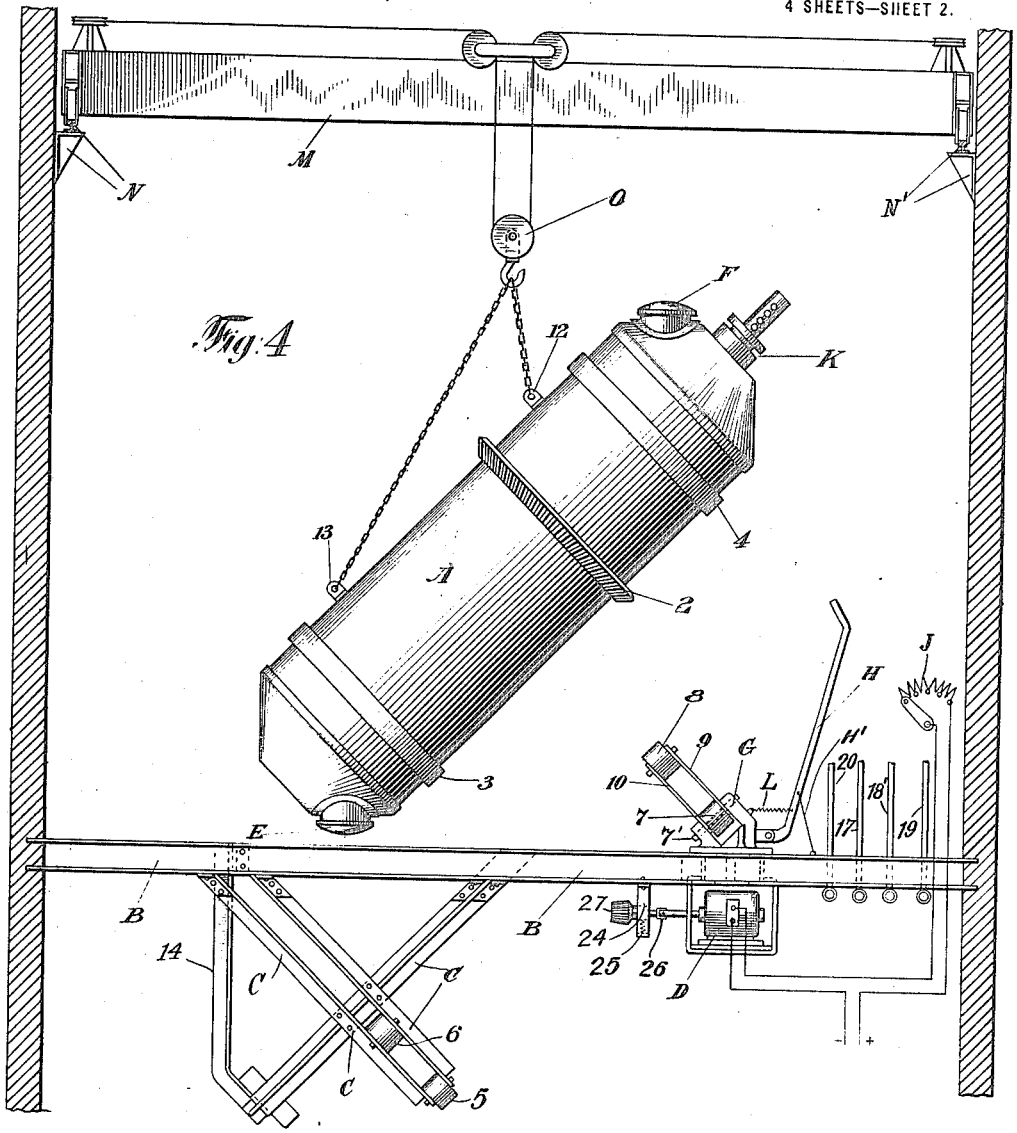

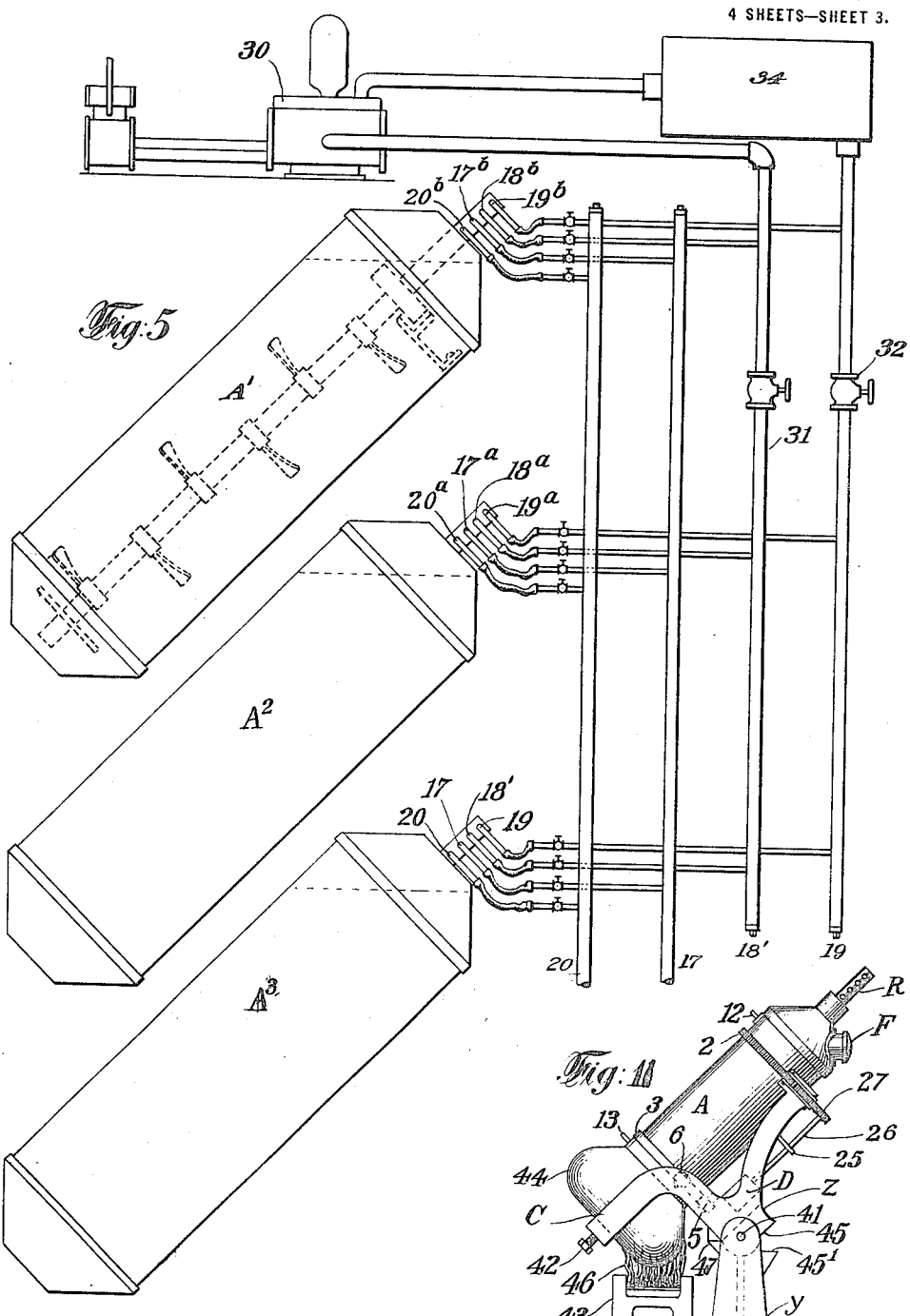

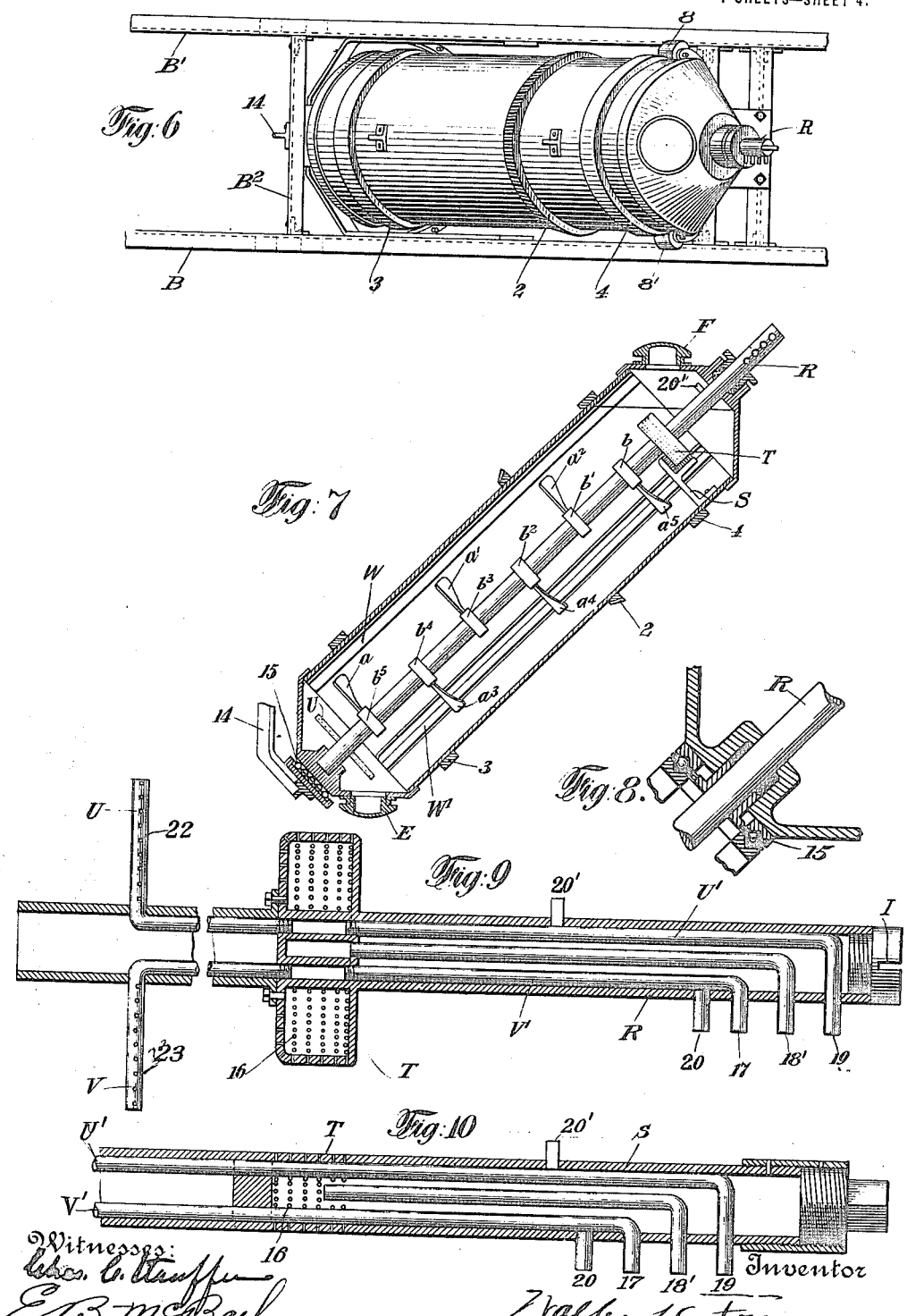

UNITED STATES PATENT OFFICE.

WALTER K. FREEMAN, OF OSCAWANA, NEW YORK.

APPARATUS FOR HARVESTING THE CONSTITUENTS OF WOOD AND VEGETABLE SUBSTANCES, DISTILLING AND PURIFYING THEM.

1,231,247.

Specification of Letters Patent. Patented June 26, 1917.

Application filed August 14, 1913. Serial No. 784,839.

*To all whom it may concern:*

Be it known that I, WALTER K. FREEMAN, a citizen of the United States, residing at Oscawana, in the county of Westchester and State of New York, have invented certain new and useful Improvements in Apparatus for Harvesting the Constituents of Wood and Vegetable Substances, Distilling and Purifying Them; and the following is a specification.

This invention relates to an improved apparatus for extracting, separating, liberating and harvesting the products from mixtures of soluble and insoluble substances such as wood and vegetable substances especially useful in arts and industries, medicines and manufactures, and to the treatment of wood and vegetable substances for liberating essential products and for operating and disposing of the spent materials.

Among the important objects of the invention are, to provide a means for economically operating upon the materials from which extracts are to be obtained and in this regard the apparatus is suitable for treating comminuted wood intended for pulp, to free it from deleterious substances injurious to the ultimate fiber; for treating sliced or comminuted beets for extracting the sugar constituent, especially; for treating various kinds of wood to secure their essential oils; for treating various kinds of wood and vegetable substances; to secure their respective ingredients such as acids, aromatics, volatile oils, gums and sugar constituents; for treating for extraction substances of mineral origin, such as comminuted ores, or of animal origin such as bones or wool, and to provide containers interchangeable in operation. These containers are provided when necessary, with suitable resistant linings.

The form of apparatus with the connections and operating parts that appear to be most desirable are shown by the accompanying drawings. The closed chamber operating as a digester or still, I have designated as the container, and Figure 1 represents a side elevation showing it and the cradles in which it is operated, an electric motor for rotating it, and a frame for holding and supporting the operating parts.

Fig. 2 is a front or end elevation of the same, and

Fig. 3 is a view looking at it from the reversed end of Fig. 2.

Fig. 4 is a side elevation showing a container suspended in a traveling crane which is operated for conveying the containers to or from the cradle where they are rotated, heated, or operated upon.

Fig. 5 is a diagrammatic view showing three containers connected for operating in accordance with my invention and a pump for circulating the solution and pipes through which it may be directed to flow in multiple, series, or multiple-series in and out of the respective containers, and other pipe connections through which gas or vapor may be directed to flow in a similar manner.

Fig. 6 is a plan view showing a container and supporting frame and some of the parts of the cradle in which it operates.

Fig. 7 is a sectional view of a container showing some of the internal mechanism in elevation.

Fig. 8 shows a modification of the arrangement of the shaft.

Figs. 9 and 10 are modifications of the part R shown in Fig. 7, and

Fig. 11 shows a modified form of apparatus as a whole that will be described separately.

In the following description letters represent various parts of the apparatus, and numerals represent the details of them, like letters or figures represent like parts or details throughout the various sheets of drawings.

In Fig. 1, A represents a container, B the frame, C the lower cradle, D an electric motor, E and F manholes through which the containers are charged and discharged, G, the upper cradle, H the retainer bars, fitting in a socket in the end of shaft R, which prevents the shaft R from turning within the container, K a stuffing box, P a ball bearing more clearly shown in Fig. 7 at 15.

In Fig. 6 the construction of the frame B is more clearly illustrated. Again refer-ring to Fig. 1, to the frame B and B' there are attached the various parts of lower cradle C as shown in the various figures and sheets of drawings, and G the upper cradle which is pivoted, as indicated in Fig. 1, so as to adjust itself to any variations there may be between the collars or tracks 3 and 4. The container A is rotated upon the rollers 5, 6, 6', 7, 8 and 8', by means of electric motor D operating a pinion that engages in gear rack 2. C' represents the supports between which the rollers 5, 6 and 6' operate, and members 9 and 10 serve similar purpose for retaining the rollers 7, 8 and 8'. 14 and 14' indicate details of lower cradle C and the construction of the supporting framework. 12 and 13 are ring lugs attached to containers A into which a chain or other device may be hooked for lifting it out of the cradles. This is more clearly illustrated in Fig. 4. X, Fig. 1, indicates a car and shows the position of the container at rest ready to discharge its contents.

In Fig. 7, R represents a central shaft. This shaft is hollow. W and W' represent flanges or projections arranged on the inner side of the container A which serves for changing the position of the contents or stirring them. $a$ to $a^5$ represent propeller-like blades or projections forming a part of and connected with sleeves $b$ to $b^5$ which are arranged upon and securely fastened to the shaft R. Fig. 9 represents a longitudinal section of the hollow shaft R showing inlets 17 and 19 leading, by means of pipes V' and U' to right-angle extensions V and U and also showing inlet 18' and 20 and intake 20'. T is a strainer, head, or drum. 16 indicates holes drilled into the chamber case to form a strainer. A covering of woven wire might be used instead. A brush or scraper S for removing any substance that may collect upon the strainer T, may be provided.

When a fluid is caused to flow into pipe 19 it passes through pipe U' out through the holes 22 arranged in the bent part U and upward through the substances contained in container A and is drawn into the holes 16 of the strainer T and out through pipe 18'. When gas or vapor is admitted at the point 17 it flows through pipe V' and out of holes 23 in V upward through the contents of container A and into orifice 20' and out through the pipe 20.

Fig. 10 represents practically the same sort of an arrangement varying only in details of construction, the purpose being identical. Fig. 8 shows a modification for the arrangement of shaft R, which, as shown, may be withdrawn to provide a passage through the ball bearing 15 for flowing in or withdrawing liquids from the container A. J Fig. 4 indicates a rheostat and switch for controlling the motor D, H' a rod hook for holding retaining bar H out of position, L a spring for keeping the retainer bar H in the slot I of the shaft R to prevent it from turning. 7' is a pin passing through the upper cradle G and roller 7 to permit rocker arms 9 and 10 to freely move to adjust the rollers 8 and 8' to position and to the contour of the collar 4. 24 shows a guide and support for the shafts of the electric motor D, which is provided with a universal joint 26, and made adjustable by means of the spring 25 which serves to force it upward against the beveled gear 2. The object of this arrangement is to allow for any inaccuracies there may be in gear 2, and also for the pinion 27 to readily engage itself in said gear 2 when the containers are placed in the cradle.

The diagrammatic drawing, Fig. 5, indicates a pump 30 connected with pipes 31 and 32 attached to branches for circulating an extracting solution or fluid in the multiple, through pipes arranged in hollow shaft R and indicated by 18' and 19 of container $A^3$, as $18^a$ and $19^a$ of container $A^2$, and as $18^b$ and $19^b$ of container $A^1$. This allows for the circulation of the extracting solution in and out of each of the containers independent of the others and collectively through the pump 30 where it is more or less blended, and each time it is flowed through the substances contained in the respective containers it assumes more and more a uniform quality of saturation.

In treating sugar beets it is not desirable to have the pump connected directly to the inflowing sugar beet solution as it would most likely deliver some air to the slices of beets, and this is objectionable, therefore, the suction side of the pump is used for drawing off the liquid which is delivered to a reservoir 34 located far enough above the containers to create a proper working pressure.

Any desired gas or vapor either reactive or neutral may be circulated through the containers in a manner similar to that heretofore discussed, or it may be introduced serially, that is to say, the gas or vapor may be introduced in container $A^1$ through pipe $17^b$ and withdrawn through pipe $20^b$ and sent into $A^2$ through pipe $17^a$ and withdrawn through pipe $20^a$ and sent into $A^3$ through pipe 17 and withdrawn through pipe 20 and disposed of in any desired manner. It is obvious that the extracting solution or fluids may be circulated serially through the various containers, it being only a matter of pipes and fittings to accomplish this result.

Under some conditions in practice it may be found desirable to withdraw the cooking or extracting solutions from the container or containers by means of a pump attached in multiple or in series to pipe 18' and to deliver such extracting or cooking solution to a settling or operating tank located at a point considerably above the inlet 19 arranged for flowing cooking or extracting fluids through various containers arranged in multiple or series, in order that the substance flowed through them may receive treatment or be allowed to settle. In such case it is evident that at the upper end of the container A there is a suction or vacuum created, while at the lower point the inflowing solution is under pressure, and during the time of this combined action of vaccum and pressure the contents of the container are subjected to some agitation by reason of the container being slowly revolved by the electric motor D or by other suitable means.

In Fig. 11 there is shown a self-contained apparatus made substantially in accordance with the above description. The supporting cradle is somewhat different from that heretofore described, the means for charging and discharging the contents of the container are varied, and the means for heating the substances operated upon are changed so as to permit the use of direct or indirect heat.

The drawing shows the container A mounted upon a foundation column Y which is provided with supporting projections 45' and 47 so that when the cradle C is rotated upon the pin 41 a stop is provided that affords means for properly locating the cradle C and container A, so that it can be readily charged or discharged through the port F.

The container A is rotated by means of an electric motor indicated by the dotted lines D. 25 represents a bearing or support for the motor shaft, 26 the shaft and 27 the pinion engaging the gear that supports the rollers that operate in connection with gear 2, and 5 and 6 indicate the rollers on the lower rest upon which A is rotated. 42 represents an adjustment screw, 43 a fire box. 46 indicates the position of the fire directed upon the bulged part 44 of the container A.

It is obvious that container A may be made in any suitable form, that it may be steam jacketed or supplied with direct steam or heated from the exterior as indicated by 46, and it is also evident when the jaws 45 and 45' are brought together by the rotating of the cradle C upon the pivot 41 that the contents of the container may be discharged through the orifice F and that during this change of position the container may be rotated by means of the electric motor D without interfering with any of the internal working parts, and it is also to be observed that the holes indicated in R represent, substantially, and have for their purpose the same object as the pipes 17, 18', 19 and 20, of Fig. 9.

This particular apparatus constructed according to my invention and with consideration for the detail herein set forth, has many uses. It may be operated as a small apparatus in laboratories for research work, or by druggists for mixing and extracting purposes. It may be used as a still for separating volatile substances at different temperatures for laboratories in research work in wood pulp industries, it may be used for the extraction of ores, for degreasing wool, and it may be used to a great advantage in the manufacture of soaps and similar products, and, of course, it may be used with or without the attachment R, and affords a substantial convenient apparatus for use in connection with almost every industry that involves the question of extraction or separation of substances or for cooking or mixing compounds. It can be made of small or great capacity, and yet retain the features of simplicity and convenience. It is, as indicated above, particularly adapted for extraction of sugar beets.

In operating the apparatus the container A may be arranged in any suitable manner, preferably it is supported in the manner shown in Fig. 1.

The object in arranging the containers in the manner indicated in Fig. 1 is to provide for a clear space around each operating unit of the plant; to allow the containers to be lifted out of the cradle whenever desirable or necessary; to maintain an independent operation of each container arranged as a battery; to provide for the interchanging of the containers from one set of cradles to another in order that the whole equipment may be uniformly interchangeable, and yet independent of each other so that a battery of containers may be operated to accomplish a uniform result such as the extraction of the sugar constituents from beet or oil or turpentine from pinaceous wood, or each of the containers may be operated to accomplish a different result; that is to say, one container may be used for extracting turpentine, another for boiling soap and still another for operating on sugar beets, the idea being to actually make the equipment of the plant broadly useful for the purposes herein set forth to establish a battery or series of digesters, or containers, or diffusers that may be operated in multiple, in series or independent of each other in order that the greatest scope of usefulness may be obtained.

In operating a plant established in accordance with the invention it is obvious that if a battery of ten containers were to be operated there might be twenty-five or more of them in use, some of which would be operating in the cradle, some being charged or discharged, while others were being cleaned or repaired.

One of the objects of the invention is to provide a simple, effective means for extracting juice from sugar beet, and in order that those interested in the art of beet sugar making may be able to comprehend the significance of the invention it appears necessary to give the following description of the art.

Sugar beets are composed of cellular tissue, traversed lengthwise by vascular tissue and enveloped in an epidermal system of cells. Irrespective of the shape of the cells or their dimensions they are supported by an intercellular substance and spaces filled with air, or oxygen, and it has hitherto been impossible to extract the sugar base from the living cells of the beet because of the impenetrability of the utricle sacs or little air cells which are distributed generally throughout the tissue. I term the air contained in these cells organic oxygen.

Some authorities refer to the little air cells as protoplasmic utricle and contend that such sacs are detached from the cell walls of the tissue by heat, and that sugar juice is extracted by diffusion and slowly lixiviated by water, but it is not entirely clear what takes place in the cells themselves and no authority is able so far, to tell whether the cell walls distributed through the beet tissues are closed membranes or separate osmotic cells, and therefore no exact theory can be advanced, and this whole state of the industry is problematical.

There is another doubtful condition existing in the beet sugar industry which relates to the dimensions and character of the diffusers or percolators, and to the proper thickness of the slices of beet. Usually diffusers have caused much dissatisfaction and have failed in their purpose to uniformly extract the sugar contents of the beet, and those who have studied beet sugar factories have found it impossible to formulate a satisfactory system for preparing the slices of beets for the diffusers, or means to regulate the method of extraction. In other words, heretofore there has been no satisfactory apparatus obtainable for securing the sugar constituents of beets economically to the best advantage.

My invention embraces simple and orderly steps in a systematic method for uniformly treating the sugar beets to extract their valuable contents. To accomplish this in accordance with my invention sugar beets are cut in moderately thick slices or strips, say one-eighth to five-eighths of an inch in thickness and then are placed in one of the series of containers. Hydrogen gas, which has great diffusive power, is then admitted through the pipe V', Fig. 9, for the purpose of expelling all the attached or casual air that may surround or be contained in the slices or strips of beets, as well as that originally contained, then the container is caused to revolve slowly and warm water is admitted through pipe U' and is withdrawn through strainer T and pipe 17. The hydrogen gas is expelled by the inflowing warm water, but it has served its purpose to prevent oxidation. It also has replaced in part, at least, the air or oxygen in the utricle cells. The inclined position of the digester permits any heavy impurities to fall clear of the stirring blades and to move down the inclined wall toward the bottom where it may be removed. Likewise floating impurities make their way to the top; impurities of both types being enabled, by reason of the incline, to free themselves quickly from the stirrer and thus avoid largely any contaminating effect upon the fluid contents, by reason of their being broken up or beaten too much by said stirrers.

After a battery of seven or eight containers have been filled with slices of beets and placed in the cradle and the air has been removed by the introduction of hydrogen gas and warm water has flowed to and through them, they may be operated in series, multiple, or multiple-series, but in whatever way they are operated care should be taken not to introduce air in them, and to obviate this it is best to draw the juice solution from the containers by means of a pump and force it into a reservoir located considerably above the inlet of the pipe U' and have it connected to the battery of containers and provided with suitable pipes, valves, and connections for directing the flow of the beet juice solution to any one or more of the containers as may be desired. I do not limit myself to hydrogen, as other gases, non-oxidizing, may be used.

From this description it will be understood that a battery of containers is made almost continuously operative, there being scarcely any interruptions in the process of extraction so that no time need be lost in the charging or discharging the containers, and it is also obvious that there is an even flow of the beet juice solution through the slices of beets, and if the water be kept at the regular temperature there is no danger of overheating them to cause coagulated masses of beet stuff that will prevent the even flow of the fluid around the slices of beets under operation.

In this process there is an invariable fixed relation between the beet juice solution and the slices of beets operated upon. The flow of the beet juice solution is uniform and there is no frothing or scum formed, because the air is first exhausted from the slices of beets which have been slowly moved about in the presence of hydrogen gas to free them of the air upon or about them.

When apparatus made in accordance with my invention is used for making wood pulp, practically the same conditions must be observed and hydrogen gas is admitted in about the same way and for the same purposes, and this is true when it is desired to harvest essential oils from wood or vegetable substances. When the apparatus is used in the manufacture of soap or for compounding or mixing of substances, modifications may have to be made to meet the requirements found best in practice, and of course, there are many conditions possible where the central hollow shaft R may well be omitted, and in other instances where the containers are used in the manner indicated in Fig. 11 or as a still, the flanges W and W', and the hollow shaft R may all be omitted, but rarely would it be desirable to dispense with the feature of rotation and means for mixing or stirring the substances under treatment. Another object of the invention is the provision of a simple and effective means for charging the digesters, containers or diffusers in one place, sending them to another place where the contents can be treated or operated upon, and then removing them from this place and conveying them to another where they may be emptied, and the contents disposed of in the most profitable way.

I claim:

1. An apparatus for extracting from vegetable fibers soluble constituents, comprising in combination a rotatable container, cradles for supporting said container in an inclined position, a fixed hollow shaft mounted lengthwise of the container, means for rotating the container about the shaft, and means for introducing into the container, through the hollow shaft, various solvent or chemically active agents, substantially as described.

2. An apparatus for extracting from vegetable fibers soluble constituents, comprising in combination a rotatable container, cradles for supporting said container in an inclined position, a fixed hollow shaft mounted lengthwise of the container, means for rotating the container about the shaft, means for introducing into the container, through the hollow shaft, various solvent or chemically active agents, and means for circulating and withdrawing said agents.

3. An apparatus for extracting from a mixture of soluble and insoluble matters, the soluble ones, comprising in combination a rotatable container mounted in an inclined position, a hollow shaft passing through said container, releasable means for holding said shaft against rotation, means for rotating the container about the shaft, means for introducing and withdrawing fluids through said hollow shaft, continuously, and means for causing the circulation of said fluids through the contents of the container during the period between their entrance and their withdrawal.

4. An apparatus for extracting from a mixture of soluble and insoluble matters, the soluble ones, comprising in combination, a rotatable cylindrical container, mounted in an inclined position, a hollow shaft passing into said container, means for holding the shaft against rotation, means for rotating the container, means passing through the shaft and into the container for conducting several fluids through the shaft into the container, and out again, substantially as described.

5. An apparatus for extracting, from a mixture of soluble and insoluble matters, the soluble ones, comprising in combination, a rotatable container, upper and lower cradles for supporting said container in an inclined position, the upper cradle being adjustable, to permit proper adjustment of said container, a gear passing around said container, a pinion engaging said gear, a motor driving said pinion, a fixed hollow shaft passing into said container, pipes leading from the exterior of the said hollow shaft and discharging into said container, a strainer on said hollow shaft, pipes leading from the hollow shaft to the exterior of said shaft whereby fluids may be passed through said pipes into the container through the strainer, and through the shaft to the exterior again while the container is rotating, substantially as described.

6. An apparatus for harvesting the constituents of wood and vegetable matter which comprises, in combination, a series of rotatable containers, a fixed hollow shaft for each, inlet pipes leading through said shaft and discharging into the container, outlet pipes leading from said hollow shaft whereby fluids may be circulated through each container, the pipes of said containers being connectible in series or in multiple, a pump for causing circulation and extracting, and means for stirring the content of said containers.

7. An apparatus for harvesting the constituents of wood and vegetable matters which comprises in combination a rotatable container, an upper and a lower cradle for supporting said container, one of said cradles being pivoted in parallel to the axis of said container, rollers on said cradles, collars or tracks on said containers for engagement with said rollers, a hollow shaft passing lengthwise into and through said container, a slot in the upper exterior end of said shaft, and a latch pivoted on the frame and engageable with said shaft to prevent it from rotating, substantially as described.

8. An apparatus for extracting soluble from insoluble matters which consists in the combination of a container provided with admission and discharge openings and rotatable on its longitudinal axis, roller carrying cradles for supporting said container in an oblique position, said containers being removable, one of said cradles being adjustable, a motor for rotating said container, a variable resistance for controlling the speed of rotation, and means for circulating and withdrawing fluids through the contents of said container.

In testimony whereof I affix my signature, in the presence of two subscribing witnesses.

WALTER K. FREEMAN.

Witnesses:
A. L. STONE,
J. J. GARLAND.